United States Patent [19]

Klee

[11] 4,384,171

[45] May 17, 1983

[54] AUTOMATIC TELEPHONE SILENCER

[76] Inventor: Maurice M. Klee, 262 Euclid Ave., Fairfield, Conn. 06432

[21] Appl. No.: 216,660

[22] Filed: Dec. 15, 1980

[51] Int. Cl.³ .................. H04M 1/00; H04M 11/00
[52] U.S. Cl. .............................. 179/84 C; 179/2 TC; 368/13
[58] Field of Search ............. 179/2 TC, 84 C; 368/4, 368/13; 250/551; 323/902

[56] References Cited

U.S. PATENT DOCUMENTS

| | | | |
|---|---|---|---|
| 2,481,840 | 9/1949 | Hardgrave | 179/84 C |
| 3,867,584 | 2/1975 | Rengren | 179/84 C |
| 3,982,072 | 9/1976 | Dean | 179/2 TC |
| 4,303,831 | 12/1981 | El Hamamsy | 250/551 |

OTHER PUBLICATIONS

FCC Registration No. BK685T-67788-OT—E, granted 3/28/79, to The Burket Company, Toledo, Ohio.
Gilder, Jules H., *Telephone Accessories You Can Build*; pp. 71–72, Hayden Book Company; Rochelle Park, N.J., 1976.
Installation Instructions and Package Card Accompanying the Phone SILENCER TM manufactured by Zoom Telephonics, sold by Radio Shack, Cat No. 43-125.
Installation Instruction Accompanying the SILENT KNIGHT TM manufactured by Saxton Products; Congers, N.Y.
*IBM Technical Disclosure Bulletin*, vol. 10, No. 7, Dec. 1967, p. 1068; "Solid State Switch" by D. G. East.
Application Note, 200.62, 1/73; "Photon Couplers" by Korn et al; General Electric, Semiconductor Products Department; Syracuse, N.Y.
*Electronics*, Nov. 27, 1975, pp. 120–121; "Optical Isolator Circuit Shows Phone-Line Status" by Matthew L. Fichtbaum.

*Primary Examiner*—G. Z. Rubinson
*Assistant Examiner*—Keith E. George

[57] ABSTRACT

Electrically operated apparatus silences a telephone ringer in a modular jack telephone system. The apparatus, by means of a photoresistor, or a triac-photoresistor combination, interrupts the conductive path to the telephone ringer while maintaining electrical isolation between the electrical driving current for the apparatus and the telephone network. Connected to the driving current is an incandescent or neon bulb, which, when activated, illuminates the components placed in the ringer's conductive path. Those components, when not illuminated block ringing current, and when illuminated permit it to flow.

9 Claims, 2 Drawing Figures

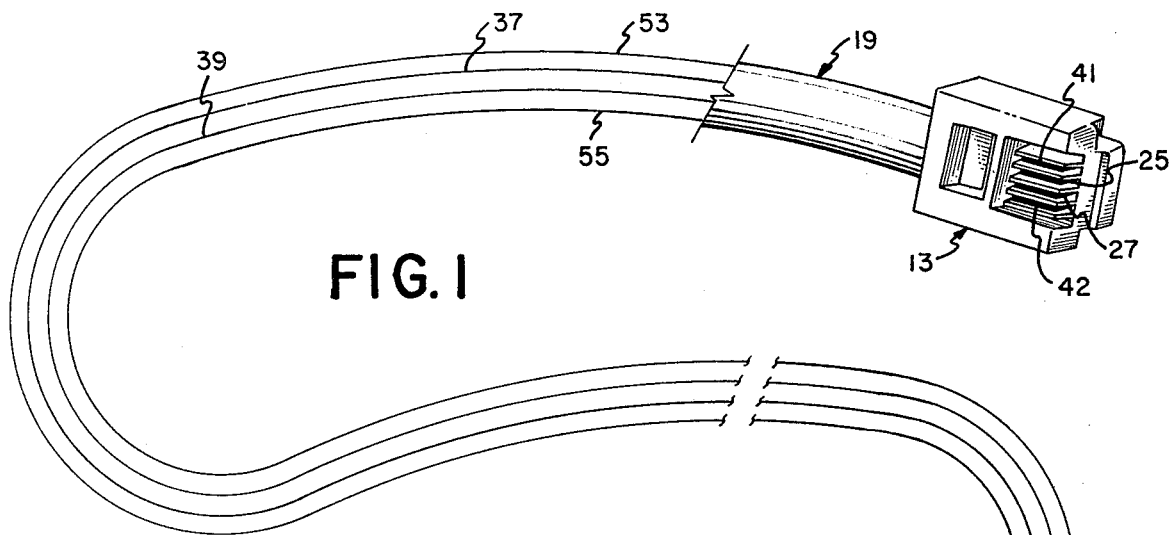
FIG. 1
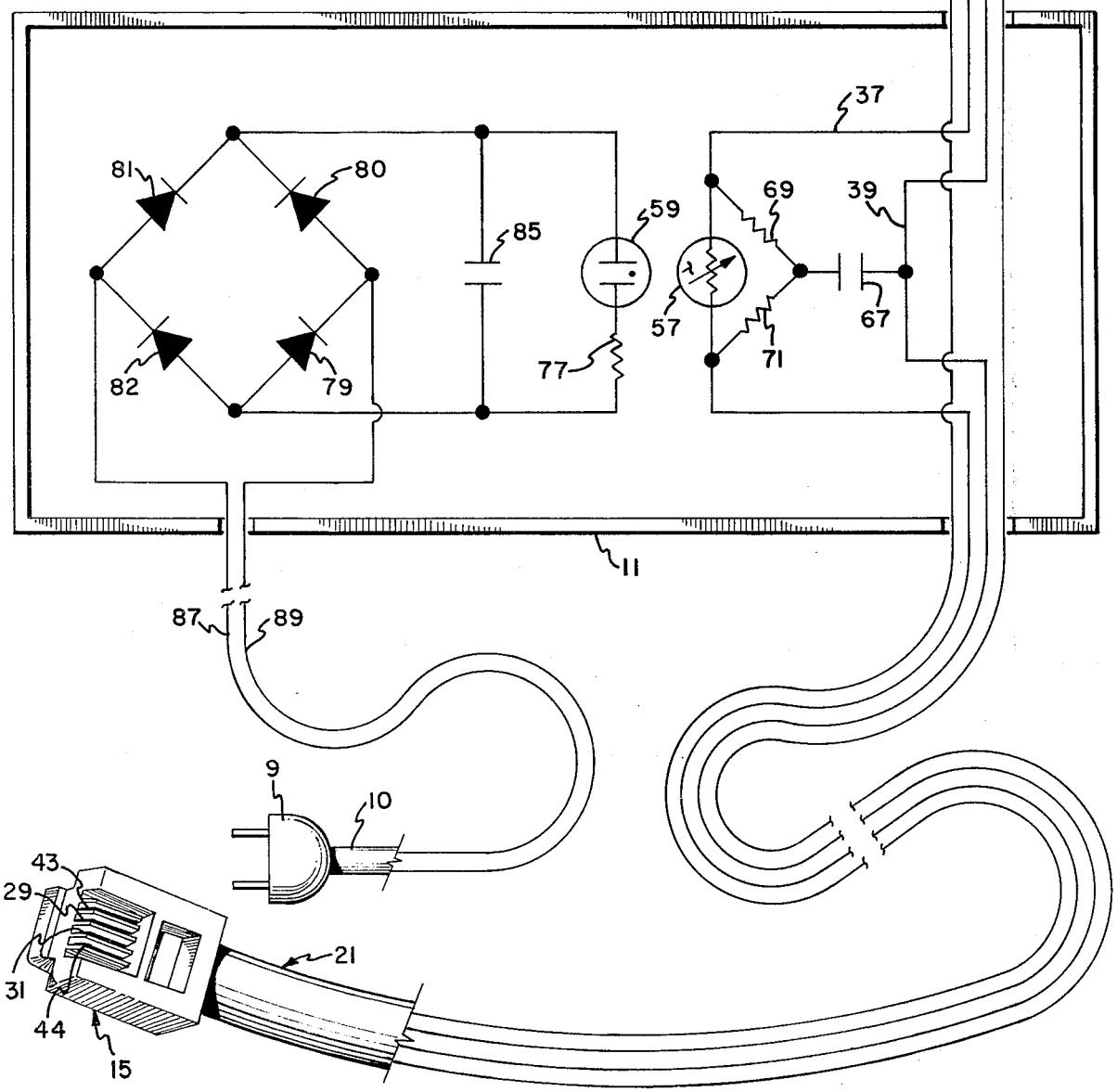

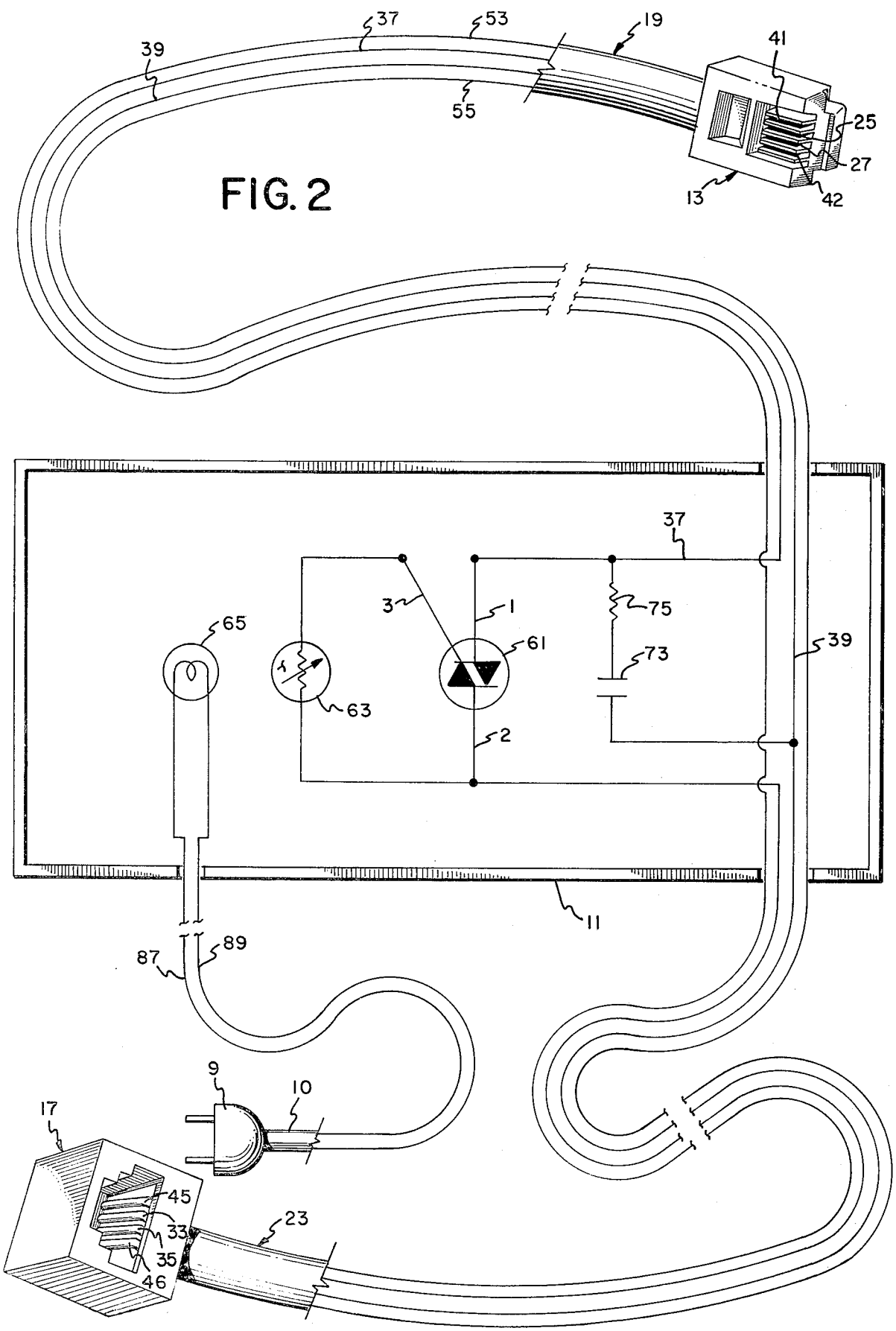

AUTOMATIC TELEPHONE SILENCER

BACKGROUND OF THE INVENTION

1. Field of the Invention

This invention relates to electrically operated apparatus for silencing a telephone ringer automatically on a daily basis for those periods of time when the user does not want the telephone to ring. The apparatus places the ringer under the control of a 24-hour timer. Once the user chooses the time period or periods he wants the ringer off and sets the timer accordingly, the apparatus will automatically silence the telephone for those periods on a daily basis without any further attention by the user.

2. Description of the Prior Art

People have been annoyed at certain times of the day by the ringing of a telephone ever since telephones came into their homes and offices. Some people have used home remedies to avoid this disturbance and prevent the telephone from ringing. For example, they have placed the telephone where they could not hear it, they have left the receiver off the hook and they have set the ringer at its lowest possible volume. The telephone company has even provided an option whereby the telephone installer can set the lowest ringer volume to be essentially inaudible and thus off.

A major drawback with each of these remedies is that it is always necessary for the user to remember to employ the remedy and silence the telephone and then remember to reactivate it. None of these methods perform either the on or off function automatically on their own. As a result, people either forget to turn the ringer off and thus receive calls at annoying times or forget to turn the ringer back on and thus miss calls they are willing to receive.

Over the years a number of patents have issued, including U.S. Pat. Nos. 2,481,840, 3,867,584 and 3,982,072, relating specifically to the problem of silencing telephone ringers. None of these patents, however, have provided a practical way of automatically turning the ringer on and off at preselected times on a daily basis. Moreover, the apparatus described in these patents would require physical wiring into the telephone system which would be difficult for the average user to do, or would lead, typically, to "howling" from the telephone. In addition, much of this apparatus is unduly complicated and would be prohibitively expensive to manufacture and market to consumers on a broad scale.

In recent years some commercial devices have been marketed directed to silencing telephone ringers. In particular, Saxton Products of Congers, N.Y. and Zoom Telephonics, Inc. of Boston, Mass. have offered add-on switches to turn the ringer off. Such switches are no better than the telephone company's option of having the lowest ringer volume be inaudible. Moreover, the instructions which accompany these switches describe taking apart some portion of the telephone system with tools and rewiring so that the apparatus will operate, and thus are difficult for the average person to use.

SUMMARY OF THE INVENTION

This invention overcomes the inherent problems of the prior art. It provides apparatus for placing a telephone's ringer under the control of a 24-hour timer so that once the timer is set, the ringer will be automatically silenced for one or more prescribed periods of time on a daily basis. Moreover, the apparatus uses modular connection to the telephone system so that installation by the consumer is easy and requires no tools. Furthermore, the apparatus provides electrical isolation between its driving current and the telephone system so that it can be safely connected to that system. Also, when not silencing the ringer, the apparatus does not interfere with the normal operation of the consumer's telephone. In addition, the apparatus employs a limited number of components for low cost.

BRIEF DESCRIPTION OF THE DRAWINGS

FIGS. 1 and 2 show two specific embodiments of the invention. FIG. 1 shows an automatic telephone silencer using a photoresistor to interrupt the current to the telephone ringer, a neon bulb-bridge rectifier-filter capacitor network for transferring the photoresistor between its open and closed states and male modular connectors for connecting the silencer to the telephone network.

FIG. 2 shows an embodiment using a triac gated by a photoresistor to interrupt the current to the telephone ringer, an incandescent bulb for transferring the photoresistor-triac combination between its open and closed states and male and female modular connectors for connecting the silencer to the telephone network.

As discussed fully below, alternate systems can be used in place of the systems shown in FIGS. 1 and 2 and the various systems can be mixed and matched to produce the totality of configurations of the silencer contemplated by this invention. Equivalent components can replace the devices shown and discussed.

DESCRIPTION OF THE PREFERRED EMBODIMENT

FIGS. 1 and 2 show two configurations of the automatic telephone silencer. Each configuration includes a male plug 9 at the end of cord 10 to supply driving current to the silencer, an enclosure 11 for components, and modular connectors to connect the silencer to the telephone system. For each configuration, at least one of the modular connectors is a male modular connector 13 for connection to a female modular wall jack or a female modular connector derived from a wall jack as for example through an extension cord, coupler or other device. The remaining modular connector is a male connector 15 in FIG. 1 and a female connector 17 in FIG. 2. This difference determines the types of telephones to which the silencer can be connected and the way the connection is made.

The FIG. 1 configuration can be used with telephone receivers such as the Western Electric model 500 desk telephone, having a detachable telephone cord connected to the telephone through a telephone mounted female modular connector. The silencer with its two male modular connectors 13 and 15 at the ends of two sections of telephone cord 19 and 21 serves as a replacement cord for the telephone's existing cord. Installation is accomplished by simply disconnecting the existing cord, replacing it with the silencer and plugging the silencer into a 24-hour timer.

The FIG. 2 configuration can be used both with telephone receivers having a detachable cord and with those having a fixed cord, permanently wired into the telephone, having a male modular connector at the far end of that cord. Male and female modular connectors 13 and 17 are carried at the ends of telephone cord sections 19 and 23. Installation is accomplished by unplugging the existing telephone cord from whatever female modular connector it is attached to, plugging the silencer into that female modular connector through male modular connector 13, plugging the telephone cord into the silencer's female modular connector 17 and plugging the silencer into a 24-hour timer.

Although modular connectors 13, 15 and 17 as well as plug 9 are shown in FIGS. 1 and 2 attached to cords 19, 21, 23 and 10, it is to be understood that the cords can be eliminated and any or all of these components can be incorporated into component enclosure 11. Also, additional connectors can be incorporated into the system. For example, the component housing can be equipped with two female modular connectors, to one of which is attached a section of telephone cord having a male modular connector at each end. The final configuration in this case is equivalent to that of FIG. 2.

The modular connectors 13, 15 and 17 shown in FIGS. 1 and 2 are of the miniature six position, four contact type. In most cases, the silencer will be equipped with these connectors although other connectors, as well as adapters from one type of connector to another, can be used.

For a non-party line telephone station, the FIGS. 1 and 2 connectors carry ringing and voice currents which originate across the ring and tip conductors of the telephone network, on their middle two contacts, designated 25 and 27, 29 and 31, and 33 and 35, respectively for connectors 13, 15 and 17. In FIG. 1, contacts 25 and 29 are connected to conductor 37 and contacts 27 and 31 are connected to conductor 39. In FIG. 2, contacts 25 and 33 are connected to conductor 37 and contacts 27 and 35 are connected to conductor 39. The remaining contacts, 41 through 46, connected to conductors 53 and 55, are normally reserved for telephone company use.

In addition to its connection to the telephone system, the silencer is connected to a 24-hour timer. Various 24-hour timers can be used. Such timers generally have a time-of-day indicator, a toggle or latch for establishing an on-time and a toggle or latch for establishing an off-time. The timer provides current beginning at the on-time established by the on-time toggle and ending with the off-time established by the off-time toggle. Some timers have additional toggles to provide multiple on and off periods. When used with the silencer, these timers permit silencing the telephone for more than one period of time during the day. The silencing apparatus, rather than being external to the timer, can be incorporated into its housing, and, if convenient, both can be placed within the telephone's housing.

Electrically, the silencer has two states: a closed state in which the telephone ringer can receive sufficient current to ring and an open state in which the conductive path between the telephone network and the telephone ringer is interrupted so that the ringer cannot receive sufficient current to ring and is silenced. Which state the silencer is in and transfer between the states is under the control of the silencer's electrical driving current.

Because of the potential for damage to the telephone system and injury to personnel, each state and transfer between the states must provide for and maintain electrical isolation between the silencer's driving current and the telephone network. This isolation can be achieved through the use of a non-electrical coupling, such as a coupling based on optical, thermal, acoustic or magnetic energy.

The circuits of FIGS. 1 and 2 illustrate the use of optical coupling between a photoresponding system inserted in the conductive path to the telephone ringer and illumination generated by the driving current. In FIG. 1 a photoresistor 57 is inserted in conductor 37 and illumination comes from a neon bulb 59 connected to the driving current through a bridge rectifier-filter capacitor network. The photoresistor presents a low resistance to ringing and voice currents when illuminated and a high resistance when not illuminated. In FIG. 2, the responding system uses a triac 61 gated by a photoresistor 63 and illumination comes from an incandescent bulb 65. The triac presents low resistance when gated and high resistance when not gated. The photoresistor permits gating when illuminated and prevents it when not illuminated. Although the photoresistor-neon bulb and the triac-photoresistor-incandescent bulb systems are shown in FIGS. 1 and 2 for the male-male and male-female external configurations respectively, it is to be understood that the systems can be interchanged. Also, either light source can be used with either photoresponding system.

In each circuit, the light source and the photoresponding system are housed in component enclosure 11. This enclosure is made of opaque, insulating heat resistant material so as to screen the photoresponding system from ambient light, insulate the components and the driving current from the user, and absorb without deterioration the heat generated by the light source and the passage of ringing and voice currents through the device.

The photoresponding system is inserted in conductor 37 in both FIGS. 1 and 2. For connector 13 attached to the telephone network, this conductor usually corresponds to the telephone network's normally negative ring conductor. Because the photoresponding systems are polarity insensitive, they can equally as well be placed in the tip conductor.

Bridged between conductors 37 and 39, in FIG. 1, is a Y network consisting of capacitor 67 and resistors 69 and 71. When the photoresponding system is in its open state, so that the shunt path for ringing current between conductors 37 and 39 provided by the telephone ringer cannot be reached, the bridge provides a substitute shunt path having a finite AC impedance and a large DC resistance. The Y configuration with a resistor in each arm of the Y is used so as to provide the substitute path for either orientation of the silencer, that is, with either modular connector facing the telephone network, while using only one capacitor. Typically, capacitor 67 will have a value of approximately 0.47 microfarads at a working voltage of 250 volts and will have a DC resistance greater than 10 megaohms while resistors 69 and 71 will each have a value of approximately 39 kilohms at ¼ watt. For a photoresponding system having a resistance of 60 kilohms (see discussion below) and for a 20 cycle per second applied ringing voltage, the equivalent impedance of the shunt will be approximately 33 kilohms. As an alternative to the Y network, two bridges, each consisting of a resistor and capacitor in series can be used, one on each side of the photoresponding system. Since the configuration of FIG. 2 is normally employed in only one direction, that is with connector 13 attached to the telephone network, only a single sided shunt on the network side consisting of capacitor 73 and resistor 75 is used. Typical values for these components are 0.47 microfarads and 27 kilohms respectively. The shunt networks can be eliminated for installations where an additional telephone or other apparatus, which is not silenced, is bridged across the telephone line.

Two light sources for activating the photoresponding system are shown in FIGS. 1 and 2. FIG. 1 uses a neon bulb 59 connected through a current limiting resistor 77 to a bridge rectifier-filter capacitor network which is connected to plug 9 through leads 87 and 89. FIG. 2 uses a miniature low wattage incandescent bulb 65 connected directly to the plug leads. Both sources provide steady light output which is sufficient when the source is placed close to the responding system to transfer that system into its closed state. Both sources also have a substantial operating life: the neon bulb being an inherently long-life device and the incandescent bulb either being chosen to intrinsically have long life or being operated at below rated voltage through the use of a voltage dropping resistor to achieve long life. Either light source can be used with either photoresponding system.

The full wave bridge rectifier-filter capacitor network of FIG. 1 is composed of diodes 79 through 82, which each have a peak inverse voltage rating greater than the peak AC applied voltage ($V_p$), and capacitor 85 which has a working DC voltage greater than $V_p$. The network converts AC driving current into a steady DC voltage ($V_{DC}$) plus a small AC ripple ($V_r$). The values of these voltages are given approximately by:

$$V_{DC} = V_p - V_r/2 \quad (1)$$

and $$V_r = \frac{2(V_p - V_N)}{4CfR + 1} \quad (2)$$

where $V_r$ is the peak-to-peak value of the ripple voltage, $V_N$ is the voltage drop across the neon bulb, C is the capacitance of filter capacitor 85 in farads, f is the frequency of the driving current in cycles/second and R is the resistance in ohms of current limiting resistor 77. Equation (1) follows from the definition of $V_r$.

Equation (2) is derived as follows. The neon bulb, once started, can be approximated by a pure voltage drop with negligible resistance compared to the resistance of the current limiting resistor. Accordingly, the magnitude of the steady DC current (I) flowing through the series combination of the resistor and the bulb is approximately the magnitude of the steady DC voltage ($V_{DC}$) across the series combination minus the voltage drop across the neon bulb ($V_N$), divided by the magnitude of the current limiting resistor (R):

$$I = \frac{(V_p - V_r/2) - V_N}{R} \quad (3)$$

For a full wave bridge rectifier-filter capacitor combination, the peak-to-peak ripple voltage is given approximately by:

$$V_r = I/2Cf \quad (4)$$

Substituting equation (3) into equation (4) and rearranging then gives equation (2).

Typical values for C, R and $V_N$ are 21 microfarads, 39 kilohms and 70 volts, respectively. $V_p$ for 120 volt rms current is 170 volts. Substituting in equations (1), (2) and (3) and using 60 cycles/second for f then gives a steady DC voltage of 169.5 volts, a peak-to-peak ripple voltage of 1 volt and a current flow of 2.6 milliamps.

Under these conditions resistor 77 dissipates 0.26 watts so that a ½ watt resistor is used. Diodes 79 through 82 supply this steady current and, in addition, carry the initial current to charge capacitor 85. Commonly available one ampere diodes having a surge current rating of 30 amperes for 16 milliseconds have been found adequate.

The combination of either light source with either photoresponding system of FIGS. 1 and 2 provides during illumination a steady low resistance to the flow of loop and ringing current so as not to interfere with the functioning of the telephone. When not illuminated, the responding system has high enough resistance to block incoming ringing current and thus silence the telephone.

For the circuit of FIG. 1, low closed state resistance is achieved through the use of a high conductance photoresistor and a small spacing between the photoresistor and the neon bulb. The open state resistance in the dark will depend on the particular photoresistor employed, but in general will be greater than 60 kilohms. Telephone ringers generally do not ring at applied voltages below approximately 40 volts rms. The typical ringing voltage, which the photoresistor must reduce, is 86 volts rms.

Although the specific electrical characteristics of telephone ringers vary between manufacturers and telephone types, and depend on the level of applied voltage, typical values include a total impedance on the order of 12 kilohms composed of a resistance on the order of 6 kilohms and a reactance, at ringing frequencies, on the order of 10 kilohms. The circuit composed of the silencer of FIG. 1 in series with such a ringer can be solved using complex variable techniques, the delta to wye transformation to handle the triangle composed of photoresistor 57 and shunt resistors 69 and 71 and, most conveniently, Thevenin's Theorem. For an 86 volt rms, 20 cycle/second applied ringing voltage, a 60 kilohm photoresistor and the values for the shunt components described above, the voltage drop across the ringer will be approximately 20 volts rms, well below the 40 volt level, and the ringer will be silenced.

The maximum recurrent voltage stress on the photoresistor will occur during this blocking of ringing voltage. For the circuit values described above, the peak of this voltage will be approximately 100 volts. Accordingly, a photoresistor rated above this level is used. The maximum heat generation in the photoresistor will occur during its conductive state when the telephone goes off-hook. The magnitude of the current flow in this state, depending on the particular local telephone loop, can range up to approximately 100 milliamps. Accordingly, a photoresistor having an illuminated resistance and a power rating capable of handling at least this level of current is used.

The triac of FIG. 2, when gated (triggered), presents a low resistance between its main terminals 1 and 2 to the flow of loop and ringing current. Its behavior in this state is similar to that of a forward biased diode. Gating for the triac is under the control of photoresistor 63. When the photoresistor is illuminated, it permits gating current to flow through gate lead 3 and out main terminal 1. This corresponds to quadrant I triggering for terminal 2 positive with respect to terminal 1 and quadrant III triggering when it is negative.

The triggering current itself comes from the initial portion of each half-cycle of ringing current or from the initial portion of the loop current which flows when the contacts within the telephone are closed as when the telephone goes off-hook or during pulse dialing. For small signal triacs, e.g those rated to carry a few hundred milliamps at 25° C., the required gate triggering currents and voltages are typically on the order of a few milliamps and volts, respectively. For the contacts within the telephone closed and for a reasonably low illuminated photoresistor resistance, these levels are easily achieved since the loop battery voltage applied by the telephone network is typically greater than 40 volts, and the loop current is normally greater than 20 milliamps. The maximum trigger currents will also occur for the telephone contacts closed and, depending on the local loop, can be as high as approximately 100 milliamps. Even small signal triacs can typically withstand this level of triggering current.

During ringing, triggering will occur in most cases. However, because ringing can in some cases involve relatively low current flows, the required triggering levels for some triacs may not be achieved. Normal ringing nevertheless will occur even in these cases by means of the conductive path consisting of photoresistor 63, gate lead 3 and main terminal 1, provided the photoresistor has an illuminated resistance which is low compared to the impedance of the telephone ringer and the gate junction is sized to carry a sustained sub-triggering current flow.

Once triggering occurs, the potential at gate lead 3 becomes essentially equal to the potential at main terminal 2 so that, in effect, photoresistor 63 is eliminated from the circuit. Accordingly, the photoresistor need only be sized to carry pre-triggering current flows. This permits the use of low power photoresistors which in general are less expensive.

The elimination of the photoresistor upon triggering also means that the photoresistor does not have to have a constant resistance, provided its resistance stays below a value which will permit triggering or ringing, when the flow of ringing current does not lead to triggering. This permits the elimination of the bridge rectifier-filter capacitor network from the illumination portion of the circuit of FIG. 1, when neon bulb illumination is used with the triac-photoresistor combination of FIG. 2, leaving neon bulb 59 and current limiting resistor 77 connected directly to leads 87 and 89. The light output of the neon bulb for this circuit arrangement will be a series of pulses at twice the line frequency, as first one bulb electrode becomes negative, exceeds the breakdown potential, glows and becomes extinguished, and then the other electrode follows the same process. Since the time constant for conductive decay of the photoresistor typically is long compared to this pulse frequency, the photoresistor's resistance will rise only a limited amount between pulses. If the maximum value reached will still permit triggering and ringing, the fluctuations in resistance will not have a detrimental effect on the operation of the user's telephone. In practice, this has been found to be the case.

When not illuminated, photoresistor 63 both blocks triggering current and the flow of current to the telephone's ringer through the path consisting of the photoresistor, the gate junction and main terminal 1. The triac itself, in the absence of triggering, presents a resistance between terminals 1 and 2, typically in the megohm range provided the breakdown voltage of the triac is not exceeded. Small signal triacs having breakdown voltages more than sufficient to prevent ringing are generally available and are used.

In summary, this invention provides electrically operated apparatus for automatically silencing a telephone ringer in a modular jack telephone system. Inserted in the conductive path to the telephone ringer is a means, electrically isolated from the silencer's source of electrical current, for interrupting the conductive path to the ringer, having a closed state in which the ringer can receive sufficient ringing current to ring and an open state in which the ringer cannot receive sufficient current to ring and is silenced. Connected to the silencer's source of electrical current and associated with the ringing path interrupting means, is a means for transferring the interrupting means between its open and closed states while maintaining the interrupting means electrically isolated from the silencer's source of electrical current.

It is understood that various modifications to the features of this invention can be made by those skilled in the art without departing from the invention's scope and spirit. Accordingly, it is not intended that the claims appended hereto be limited to the description set forth herein but rather that the scope of the claims be construed as encompassing all equivalents of the features of this invention.

I claim:

1. Electrically operated apparatus for automatically silencing a telephone ringer in a modular jack telephone system comprising:
    means for connecting said apparatus to a source of periodic electrical current associated with a 24-hour timer;
    modular connecting means compatible with a modular jack telephone system;
    a conductive path electrically connected to said modular connecting means for carrying ringing current to a telephone ringer;
    means for interrupting said conductive path, electrically isolated from said source of electrical current, having a closed state in which said ringer can receive sufficient ringing current to ring and an open state in which said ringer cannot receive sufficient current to ring and is silenced;
    means electrically connected to said source of electrical current connecting means and associated with said interrupting means for transferring said interrupting means between said open and closed states while maintaining said interrupting means electrically isolated from said source of electrical current.

2. The apparatus of claim 1 wherein said interrupting means comprises a photoresistor and said transferring means comprises a neon bulb driven by a bridge rectifier-filter capacitor network.

3. The apparatus of claim 1 wherein said interrupting means comprises a photoresistor and said transferring means comprises an incandescent bulb.

4. The apparatus of claim 1 wherein said interrupting means comprises a triac gated by a photoresistor and said transferring means comprises an incandescent bulb.

5. The apparatus of claim 1 wherein said interrupting means comprises a triac gated by a photoresistor and said transferring means comprises a neon bulb driven through a current limiting resistance.

6. The apparatus of claim 1 further comprising bridge means symmetrically arranged with respect to the interrupting means for providing an essentially identical substitute path for ringing current when the apparatus is in its open state for either end of the interrupting means connected to the telephone system.

7. The apparatus of claim 6 wherein the bridge means comprises a capacitor in series with two essentially equal parallel resistors, one of the resistors being connected to one end of the interrupting means and the other resistor being connected to the other end of the interrupting means.

8. Apparatus for silencing a telephone ringer comprising:
   a pair of conductors for carrying ringing current;
   a modular connector at each end of the pair of conductors;
   means for interrupting one of the conductors having a closed state and an open state wherein, respectively, the ringer can and cannot receive sufficient ringing current to ring; and
   bridge means connected between the conductors and symmetrically arranged with respect to the interrupting means for providing an essentially identical substitute path for ringing current when the apparatus is in its open state for either end of the interrupting means connected to the telephone system.

9. The apparatus of claim 8 wherein the bridge means comprises a capacitor in series with two essentially equal parallel resistors, one of the resistors being connected to one end of the interrupting means and the other resistor being connected to the other end of the interrupting means.

* * * * *